United States Patent [19]
Hsu

[11] Patent Number: 5,758,825
[45] Date of Patent: Jun. 2, 1998

[54] WASHING MACHINE ADAPTED FOR AUTOMATICALLY WASHING VEHICLES, ETC.

[76] Inventor: Chi-Yuan Hsu, No. 2-12, Ling Pai Road, I Lan Hsien, I Lan City, Taiwan

[21] Appl. No.: 796,565

[22] Filed: Feb. 6, 1997

[51] Int. Cl.$^6$ .................... B05B 9/00; B05B 3/00
[52] U.S. Cl. ............... 239/127; 239/310; 134/95.3; 134/98.1; 137/893; 137/895
[58] Field of Search ................... 239/124, 127, 239/302, 310, 316, 398, 413, 569; 137/893, 895, 563; 134/95.3, 98.1

[56] References Cited

U.S. PATENT DOCUMENTS

| | | | |
|---|---|---|---|
| 3,037,707 | 6/1962 | Ligon | 239/127 X |
| 3,318,535 | 5/1967 | New | 239/310 |
| 4,238,074 | 12/1980 | Coons | 239/310 X |
| 4,848,384 | 7/1989 | Christopher et al. | 134/98.1 X |

*Primary Examiner*—Andres Kashnikow
*Assistant Examiner*—Robin O. Evans
*Attorney, Agent, or Firm*—Bacon & Thomas

[57] ABSTRACT

A washing machine including a first electromagnetic valve connected to a cleaning solution supply source, a supply pipe having a cleaning solution input port connected to the first electromagnetic valve to receive cleaning solution from the cleaning solution supply source and a clean water input port connected to a clean water supply source to receive clean water from it and an output port, a second electromagnetic valve connected between the output port of the supply pipe and an automatic nozzle for permitting clean water and/or the cleaning solution to be delivered to the automatic nozzle, and a check valve for controlling the flowing direction of the cleaning solution from the first electromagnetic valve to the second electromagnetic valve.

11 Claims, 2 Drawing Sheets

WASHING MACHINE ADAPTED FOR AUTOMATICALLY WASHING VEHICLES, ETC.

BACKGROUND OF THE INVENTION

The present invention relates to a washing machine adapted for washing vehicles, etc. The washing machine comprises a first electromagnetic valve for controlling the supply of cleaning solution, a check valve for controlling the flowing direction of the cleaning solution, a supply pipe adapted for receiving the cleaning solution from the first electromagnetic valve and clean water from a clean water supply source, and a second electromagnetic valve controlled to let clean water and/or the cleaning solution pass to an automatic nozzle for washing.

In cities, most people live in high-rise buildings. These buildings provide limited spaces for parking cars, and do not allow car owners to wash their cars in the limited parking area. Therefore, car owners usually drive their cars to car wash centers for washing. Various automatic car washing machines have been disclosed for washing automobiles automatically. These car washing machines are commonly expensive. Although these car washing machines are functional, they are not suitable for washing small vehicles for example motorcycles. Furthermore, these washing machines cannot be used for washing only a part of a car.

SUMMARY OF THE INVENTION

The present invention has been accomplished to provide a washing machine which is suitable for washing any of a variety of vehicles as well as for washing a limited area of a vehicle. According to one aspect of the present invention, the washing machine comprises a first electromagnetic valve connected to a cleaning solution supply source, a supply pipe having a cleaning solution input port connected to the first electromagnetic valve to receive cleaning solution from the cleaning solution supply source and a clean water input port connected to a clean water supply source to receive clean water from it and an output port, a second electromagnetic valve connected between the output port of the supply pipe and an automatic nozzle for permitting clean water and/or the cleaning solution to be delivered to the automatic nozzle, and a check valve for controlling the flowing direction of the cleaning solution from the first electromagnetic valve to the second electromagnetic valve. According to another aspect of the present invention, the check valve comprises a reverse flow preventing tube connected to the output port thereof, the reverse flow preventing tube having an output port disposed inside the supply pipe between the clean water input port and the second electromagnetic valve for permitting the supplied cleaning solution to be carried by clean water to the second electromagnetic valve when the second electromagnetic valve and the clean water input port of the supply pipe are opened. According to still another aspect of the present invention, a pump is mounted between the cleaning solution supply source and the first electromagnetic valve, and controlled to pump the cleaning solution from the cleaning solution supply source to the first electromagnetic valve. According to still another aspect of the present invention, the supply pipe has a clean water output port disposed between the clean water input port and the second electromagnetic valve, and connected to a water inlet of the cleaning solution supply source by a connecting pipe for guiding clean water to the cleaning solution supply source.

DETAILED DESCRIPTION OF THE PREFERRED EMBODIMENT

Figure 1:
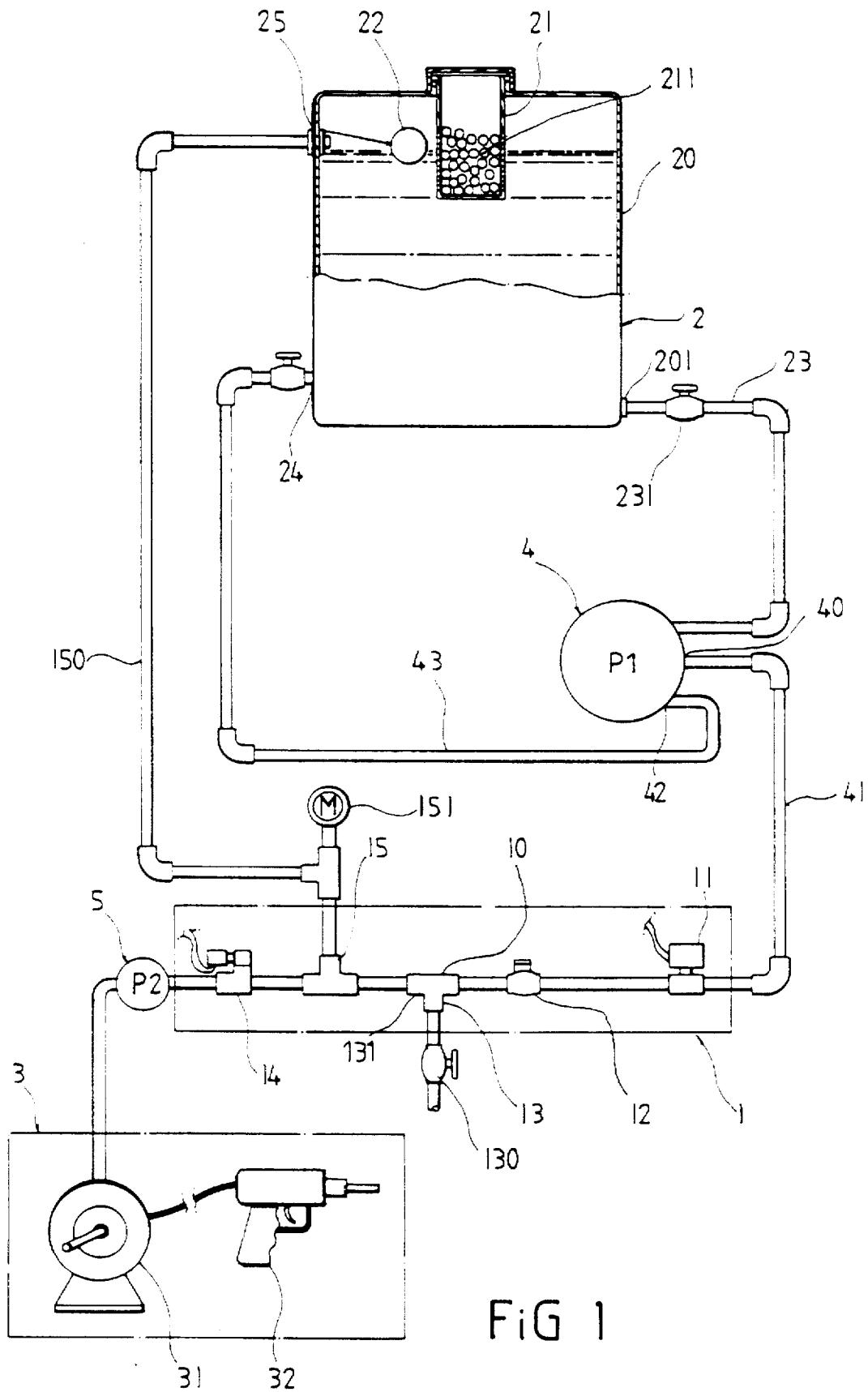
FIG. 1 is a side view of the washing machine of the present invention.
Figure 2:
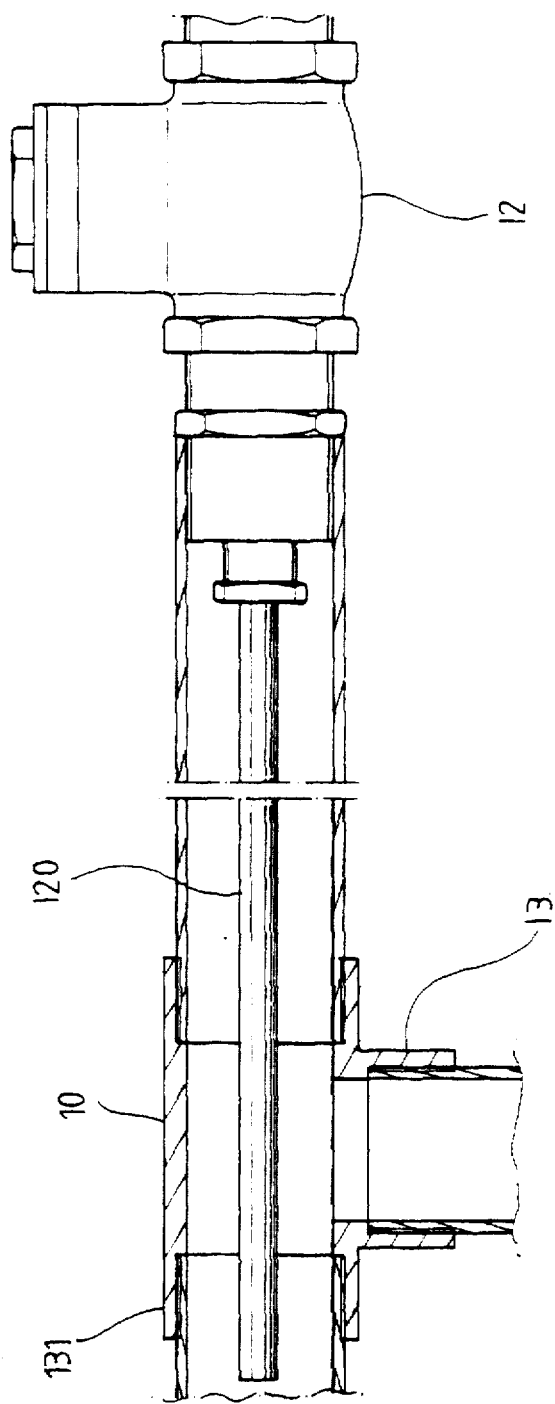
FIG. 2 is an exploded view of the reverse flow preventing tube of the check valve.

Referring to FIGS. 1 and 2, a washing machine 1 comprises a first electromagnetic valve 11, a check valve 12 and a second electromagnetic valve 14 respectively mounted in a pipe 10. The pipe 10 has a pipe connector 13 disposed between the check valve 12 and the second electromagnetic valve 14. The first electromagnetic valve 11 has an output port connected to one end of the pipe 10, and an input port connected to a cleaning solution supply source 2. The cleaning solution supply source 2 supplies the washing machine 1 with cleaning solution. The first electromagnetic valve 11 is controlled to open by a switch control circuit (not shown, that can be a coin-controlled switch control circuit). When the first electromagnetic valve 11 is opened, the cleaning solution supply source 2 immediately supplies cleaning solution to the washing machine 1. The check valve 12 is mounted in the pipe 10, having an input port connected to the output port of the first electromagnetic valve 11, and an output port coupled with a reverse flow preventing tube 120 inside the pipe 10 (see FIG. 2). The pipe connector 13 of the pipe 10 is a tee, having one end connected to the output port of the check valve 12, a second end connected to a clean water supply source (not shown), and a third end 131 connected to the second electromagnetic valve 14. A flow rate control valve 130 is connected between the pipe connector 13 of the pipe 10 and the clean water supply source, and adapted for controlling the flow rate of clean water from the clean water supply source to the washing machine 1. The reverse flow preventing tube 120 of the check valve 12 extends through the pipe connector 13 inside the pipe 10 (see FIG. 2). When clean water and cleaning solution are respectively supplied from the clean water supply source and the cleaning solution supply source 2 at the same time, they are forced to flow out of the washing machine 1 in one direction.

The second electromagnetic valve 14 has an input port connected to the third end 131 of the pipe connector 13 to receive clean water from the clean water supply source and detergent from the reverse flow preventing tube 120 of the check valve 12, and an output port connected to a liquid sprayer 3. The liquid sprayer 3 comprises a hose reel 31 and an automatic nozzle 32. The second electromagnetic valve 14 is also controlled by the aforesaid switch control circuit. When the second electromagnetic valve 14 is opened, clean water and/or cleaning solution is(are) delivered to the liquid sprayer 3, and therefore the output flow of the clean water and/or cleaning solution can be controlled to be driven out of the automatic nozzle 32 for washing vehicles, etc.

The cleaning solution supply source 2 comprises a cleaning solution container 20, a detergent container 21 suspended in the cleaning solution container 20 and holding a detergent 211, and a float valve 22. The cleaning solution container 20 has a drain port 201 connected to a first connecting pipe 23. The first connecting pipe 23 is mounted with a flow rate control valve 231 adapted for controlling the output flow rate of the cleaning solution from the cleaning solution container 20. The first connecting pipe 23 has an input port connected to the drain port 201 of the cleaning solution container 20, and an output port connected to a first pump 4. The first pump 4 has a first output port 40 connected to the input port of the first electromagnetic valve 11 by a second connecting pipe 41, and a second output port 42 connected to a return port 24 at the cleaning solution container 20 through a third connecting pipe 43. When the first electromagnetic valve 11 is changed from the open status to the close status, the first pump 4 enables the cleaning solution to flow through the third connecting pipe 43 back to the inside of the cleaning solution container 20 by means of the effect of a pressure release. When the return flow of the cleaning solution is guided from the third connecting pipe 43 into the cleaning solution container 20, it immediately mixes with and agitates the cleaning solution into the cleaning solution container 20 thereby causing the detergent 211 to be quickly dissolved in the cleaning solution.

A connector 15 is mounted in the pipe 10 of the washing machine 1 between the second electromagnetic valve 14 and the pipe connector 13, and adapted for guiding clean water from the pipe 10 to the cleaning solution container 20 through a fourth connecting pipe 150. The fourth connecting pipe 150 has one end connected to the connector 15, and an opposite end connected to a water inlet 25 in the cleaning solution container 20. The aforesaid float valve 22 is mounted inside the cleaning solution container 20 to control the passage of the water inlet 25. When the level of the cleaning solution in the cleaning solution container 20 drops below a predetermined level, the float valve 22 immediately opens the water inlet 25, for permitting clean water to be guided from the pipe 10 of the washing machine 1 into the cleaning solution container 20. On the contrary, when the level of the cleaning solution in the cleaning solution container 20 surpasses a predetermined level, the float valve 22 immediately closes the water inlet 25 to stop the supply of clean water. Further, a pressure gage 151 is installed in the fourth connecting pipe 150 to detect the pressure of clean water supplied from the pipe 10 of the washing machine 1.

When a coin is inserted into the washing machine 1 to turn on the switch control circuit, the user can select a clean water washing mode to open the second electromagnetic valve 14 and close the first electromagnetic valve 11, permitting clean water to be delivered from the clean water supply source to the liquid sprayer 3, and therefore the user can uses the automatic nozzle 32 to wash for example a vehicle with clean water. If the user selects a detergent washing mode, the first electromagnetic valve 11 and the second electromagnetic valve 14 are simultaneously opened, permitting clean water and the cleaning solution to be simultaneously guided into the pipe of the washing machine 1 from the cleaning solution container 20 of the cleaning solution supply source 2 and the clean water supply source, and therefore the user can use the automatic nozzle 32 to wash the vehicle with the mixture of the cleaning, solution and clean water.

Furthermore, a second pump 5 may be installed in between the output port of the second electromagnetic valve 14 and the input port of the liquid sprayer 3, and controlled to force clean water and/or the cleaning solution to the automatic nozzle 32 at a high pressure.

It is to be understood that the drawings are designed for purposes of illustration only, and are not intended as a definition of the limits and scope of the invention disclosed.

What the invention claimed is:

1. A washing machine comprising:
    a first electromagnetic valve having an input port connected to a cleaning solution supply source and an output port connected to an input port of a check valve, and controlled by a switch control circuit to let cleaning solution to be delivered from said cleaning solution supply source to a check valve;
    a check valve having an input port connected to the output port of said first electromagnetic valve and an output port connected to an input port of a second electromagnetic valve, and adapted for guiding the cleaning solution from said first electromagnetic valve to a second electromagnetic valve;
    a supply pipe having a cleaning solution input port connected to the output port of said check valve, a clean water input port connected to a clean water supply source, and an output port disposed in communication with said cleaning solution input port and said clean water input port; and
    a second electromagnetic valve having an input port connected to the output port of said supply pipe and an output port, said second electromagnetic valve being separately controlled by said switch control circuit to let clean water and the cleaning solution pass.

2. The washing machine of claim 1 wherein said check valve comprises a reverse flow preventing tube connected to the output port thereof, said reverse flow preventing tube having an output port disposed inside said supply pipe between said clean water input port and said second electromagnetic valve for permitting the supplied cleaning solution to be carried by clean water to said second electromagnetic valve when said second electromagnetic valve and said clean water input port of said supply pipe are opened.

3. The washing machine of claim 1 further comprising a cleaning solution supply source connected to the input port of said first electromagnetic valve, said cleaning solution supply source comprising a cleaning solution container, said cleaning solution container holding cleaning solution and having a drain port connected to the input port of said first electromagnetic valve.

4. The washing machine of claim 3 further comprising a pump connected between said cleaning solution supply source and said first electromagnetic valve, and controlled to pump the cleaning solution from said cleaning solution supply source into the input port of said first electromagnetic valve.

5. The washing machine of claim 4 wherein said pump has an output end connected to a return port of said cleaning solution container by a connecting pipe for guiding the cleaning solution back to said cleaning solution container when said first electromagnetic valve is closed after an operation.

6. The washing machine of claim 1 further comprising a liquid sprayer connected to the output port of said second electromagnetic valve for output of liquid from the output port of said second electromagnetic valve.

7. The washing machine of claim 6 further comprising a pump connected between said second electromagnetic valve and said liquid sprayer, and controlled to pump liquid from said second electromagnetic valve to said liquid sprayer.

8. The washing machine of claim 1 further comprising a flow rate control valve mounted in the clean water input port of said supply pipe for controlling the flow rate of clean water.

9. The washing machine of claim 3 further comprising a flow rate control valve mounted between the drain port of said cleaning solution container and the input port of said first electromagnetic valve for controlling the flow rate of the cleaning solution.

10. The washing machine of claim 3 wherein said supply pipe has a clean water output port disposed between said clean water input port and said second electromagnetic valve, and adapted for guiding clean water to said cleaning solution supply source.

11. The washing machine of claim 6 wherein said liquid sprayer is an automatic nozzle.

* * * * *